United States Patent [19]

Kanngiesser

[11] Patent Number: 4,625,269

[45] Date of Patent: Nov. 25, 1986

[54] HIGH VOLTAGE D-C TRANSMISSION POWER STATION WITH A GENERATOR TRANSFORMER

[75] Inventor: Karl-Werner Kanngiesser, Viernheim, Fed. Rep. of Germany

[73] Assignee: BBC Aktiengesellschaft Brown, Boveri & Cie., Baden, Switzerland

[21] Appl. No.: 674,046

[22] Filed: Nov. 21, 1984

[30] Foreign Application Priority Data

Nov. 23, 1983 [DE] Fed. Rep. of Germany ....... 3342210

[51] Int. Cl.[4] .............................................. H02J 3/36
[52] U.S. Cl. ........................................ 363/35; 363/64
[58] Field of Search .................... 363/35, 64, 68, 51, 363/37; 323/215

[56] References Cited

U.S. PATENT DOCUMENTS

| | | | |
|---|---|---|---|
| 3,949,291 | 4/1976 | Kanngiesser et al. | 363/35 |
| 3,992,659 | 11/1976 | Ekstrom | 363/51 |
| 4,279,009 | 7/1981 | Andronov et al. | 363/51 |
| 4,498,127 | 2/1985 | Fiorina | 363/68 |

Primary Examiner—Peter S. Wong
Assistant Examiner—Judson H. Jones
Attorney, Agent, or Firm—Herbert L. Lerner; Laurence A. Greenberg

[57] ABSTRACT

In the high voltage d-c transmission (HGÜ) power station in a block circuit, a three-phase generator feeds a 12-pulse high voltage d-c transmission (HGÜ) short coupler through at least one shifting transformer which serves for forming voltages of two three-phase voltage systems phase-shifted relative to each other by 30° el. As compared to a full transformer, the shifting transformer can be constructed for substantially less power, which reduces the cost and the losses of the station. While the voltages of the two phase-shifted voltage systems can be taken off at the external terminals of the secondary windings of the shifting transformer, the center taps of the secondary windings are acted upon by the generator voltage. Advantageously, the high voltage d-c transmission short coupler is formed of a multiplicity of parallel, electrically separate d-c circuits which can be fed by separate shifting transformers.

5 Claims, 4 Drawing Figures

HIGH VOLTAGE D-C TRANSMISSION POWER STATION WITH A GENERATOR TRANSFORMER

The invention relates to a high voltage d-c transmission (HGÜ) power station in a block circuit, including at least one generator transformer, and at least one 12-pulse converter formed of threephase bridge circuits.

Such a high voltage d-c transmission power station is known from the publication by F. Hoelters, K.W. Kanngiesser and W. Ziegler entitled: "Technik und Einsatzmoeglichkeiten der Hochspannungs-Gleichstrom-Uebertragung" (Technology and Applications of High-Voltage D-C Transmission), ETZ-A 89 (1968), No. 8. In the prior art device, several generators are connected through converter transformers to series-connected rectifiers of a high voltage d-c transmission system to form a unit.

As compared to a conventional high voltage d-c transmission station, this construction has the advantage of omitting a three-phase switching installation as well as filter circuits. For economic reasons, a double-block circuit, i.e., a device with 12-pulse reaction, is preferably used, because only then can the power of the generator be approximately fully utilized.

When connecting a generator to a high voltage d-c transmission power station, the rectifier and the inverter station are normally installed separately so that the technical and economic advantages of a d-c line can be utilized as compared to a three-phase line.

However, it definitely makes good sense to couple a generator to a high voltage d-c transmission short coupler, in which the rectifier and the inverter are combined in one station, because with this construction the technical advantages of high voltage d-c transmission, i.e., asynchronous coupling, no transmission of short-circuit power and fast and accurate controllability, can be fully utilized.

Another advantage of short coupling is the fact that the parameters of the d-c circuit can be optimized, free of the laws governing overhead lines, according to technical and economic criteria. In general, the rated d-c current will be chosen in such a way that the largest available power thyristors are just or exactly fully utilized as to current, and the d-c voltage will then adapt itself according to the rated power.

However, a disadvantage of using a high voltage d-c transmission short coupler, namely the considerable cost which is also due to to the use of a full transformer, should be mentioned.

It is accordingly an object of the invention to provide a high voltage d-c transmission power station with a generator transformer suitable for 12-pulse operation, which overcomes the hereinaforementioned disadvantages of the heretofore-known devices of this general type, and in which the cost is reduced considerably.

With the foregoing and other objects in view there is provided, in accordance with the invention, a high voltage d-c transmission (HGÜ) power station in a block circuit, comprising at least one three-phase generator producing a generator voltage, at least one shifting generator transformer having primary windings and having secondary windings with center taps and external terminals, the center taps being connected to the generator for receiving the generator voltage, the external terminals providing voltage in two three-phase voltage systems phase-shifted through 30° el relative to each other, and at least one 12-pulse high voltage d-c (HGÜ) short coupler having converters or three-phase bridge circuits connected to the external terminals for receiving the voltages of the two three-phase voltage systems.

The advantages obtainable by using the invention are in particular that through the replacement of the full transformer ordinarily disposed between the generator and the converter by a simple booster or shifting transformer, the space required for the high voltage d-c transmission power station, is reduced, besides the considerable cost savings, and the efficiency is improved due to the low losses.

In accordance with another feature of the invention, the converters of the short coupler include two rectifier bridges connected in parallel on the d-c side by chokes and acted upon by the phase-shifted three-phase voltage of the two voltage systems.

In accordance with a further feature of the invention, the at least one shifting transformer is in the form of a multiplicity of shifting transformers, and the short coupler is formed of a multiplicity of parallel, electrically separate d-c circuits each being fed by a respective one of the shifting transformers.

In accordance with a further feature of the invention, the converters of the short coupler include rectifier bridges having diodes and a generator switch for protecting the generator.

In accordance with a concomitant feature of the invention, the converters of the short coupler include rectifier bridges having thyristors.

Other features which are considered as characteristic for the invention are set forth in the appended claims.

Although the invention is illustrated and described herein as embodied in a high voltage d-c transmission power station with a generator transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
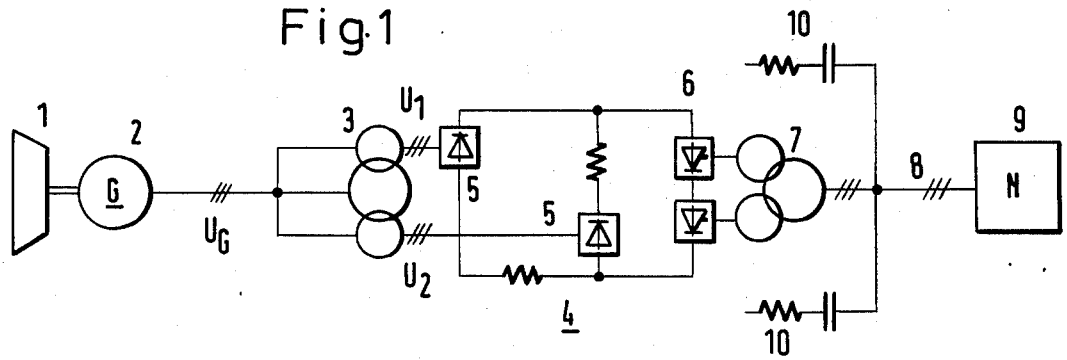
FIG. 1 is a schematic circuit diagram of an a-c transmission system including a block diagram of the generator and a high voltage d-c transmission (HGÜ) short coupler with an interposed shifting transformer.

Referring now to the figures of the drawings in detail and first particularly to FIG. 1 thereof, there is seen an a-c transmission system with a block diagram of a generator, a high voltage d-c transmission (HGÜ) short coupler and an interposed shifting transformer. A steam, gas or water turbine 1 drives a three-phase generator 2 through a shaft. The generator 2 feeds a shifting or booster transformer 3, a high voltage d-c transmission (HGÜ) short coupler 4 (formed of a rectifier 5 and an inverter 6), a network transformer 7 and a three-phase line 8 which leads into a distribution network 9. The generator voltage applied to the input side of the shifting transformer is designated with reference symbol $U_G$ and voltages of voltage systems which can be taken off on the output side are designated with reference symbols $U_1$, $U_2$.

Filter circuits 10 for compensating the harmonics caused by the high voltage d-c transmission short coupler 4, are connected to the three-phase line 8.

The rectifier 5 and inverter 6 of the high voltage d-c transmission short coupler 4 are interconnected through an intermediate d-c link and are each constructed of two three-phase bridges. Since the voltages $U_1$, $U_2$ of the voltage systems formed by the shifting transformer 3 have their origin in the neutral point of the generator, the two three-phase bridge circuits connected thereto cannot be connected on the d-c side in series, but rather only in parallel. Chokes which limit the equalization currents of the characteristic six-pulse harmonics, are provided between the parallel circuit points.

Through the use of the high voltage d-c transmission short coupler 4 it is possible to select the generator speed and therefore also the turbine speed, according to optimal criteria, taking into consideration the efficiency, costs and space required, independently of the frequency of the a-c or three-phase network 9. Two different speeds for pumping and turbine operation are therefore possible in a simple manner in a pump-fed power station or pump stotage station. In hydraulic power generating stations, the speed can be steplessly or continuously chosen as a function of the water level.

Figure 2:
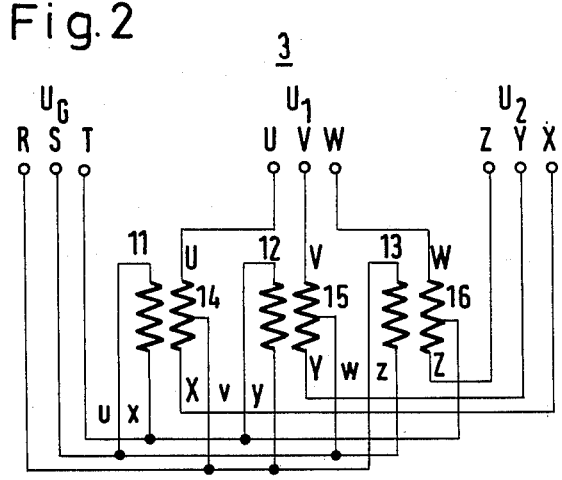
FIG. 2 is a schematic circuit diagram of a shifting transformer.

FIG. 2 shows the shifting transformer 3 which forms the two threephase voltages $U_1$, $U_2$ of the two voltage systems which are phaseshifted by $\pm 15°$ relative to the voltage $U_G$, from the generator voltage $U_G$ applied to the input side. The shifting transformer 3 has three delta-connected primary windings (low voltage windings) 11, 12, 13. The terminals u and x of the primary winding 11 are connected to the terminals S and T of the generator 2; the terminals v and y of the primary winding 12 are connected to the terminals T and R of the generator 2; and the terminals w and z of the primary winding 13 are connected to the terminals R and S of the generator 2, respectively.

The shifting transformer 3 furthermore has three secondary windings (high-voltage windings) 14, 15, 16 with center taps. The first voltage $U_1$ of the first voltage system which is phase-shifted $+15°$ relative to the voltage $U_G$, can be taken off at the outer terminals U of the secondary winding 14, V of the secondary winding 15 and W of the secondary winding 16. The voltage $U_2$ of the second voltage system phase-shifted $-15°$ relative to the voltage $U_G$ can be taken off at the outer terminals Z of the secondary winding 16, Y of the secondary winding 15, and X of the secondary winding 14. The center taps of the secondary windings 14, 15 and 16 are directly connected in this case to the terminals R, S and T of the generator 2, respectively.

Figure 3:
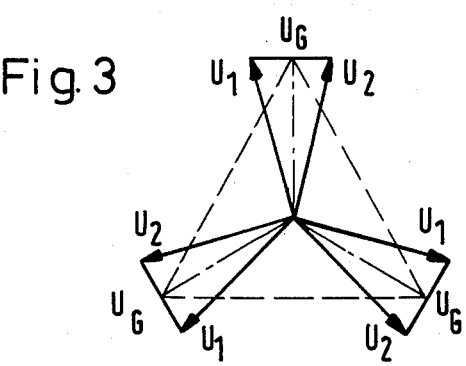
FIG. 3 is a vector diagram which indicates the phase shifts obtainable by the shifting or booster transformer.

In FIG. 3, the phase shifts $\pm 15°$ of the voltages $U_1$ and $U_2$ of the voltage systems relative to the generator voltage $U_G$ obtained by the shifting transformer 3, are shown in a vector diagram.

The circuit shown in FIG. 2 is not the only way to produce two phase-shifted systems by means of shifting transformers; for instance, a kind of matching circuit, can be provided with a Y-circuit on the primary side. However, the system shown in FIG. 2 is optimum as to cost; the rated output of the shifting transformer is only 25.9% of the throughput power.

The block circuit with a phase shift transformer causes very large d-c currents in the case of large generator power ratings, because the generator voltage $U_G$ is limited to about 25 kV for insulation reasons. These d-c currents can no longer be controlled by a single thyristor for each valve or rectifier branch, on the contrary, a larger number of thyristors would have to be connected in parallel. The direct parallel connection of thyristors requires a uniform subdivision of the current in all operating and disturbance cases. This calls for small tolerances in the thyristor parameters as well as a mechanical rectifier or valve construction with equal stray inductances of the wiring. These conditions and restraints can be circumvented if several separate d-c circuits formed of a rectifier and an inverter are each provided with a current regulator of its own.

Figure 4:
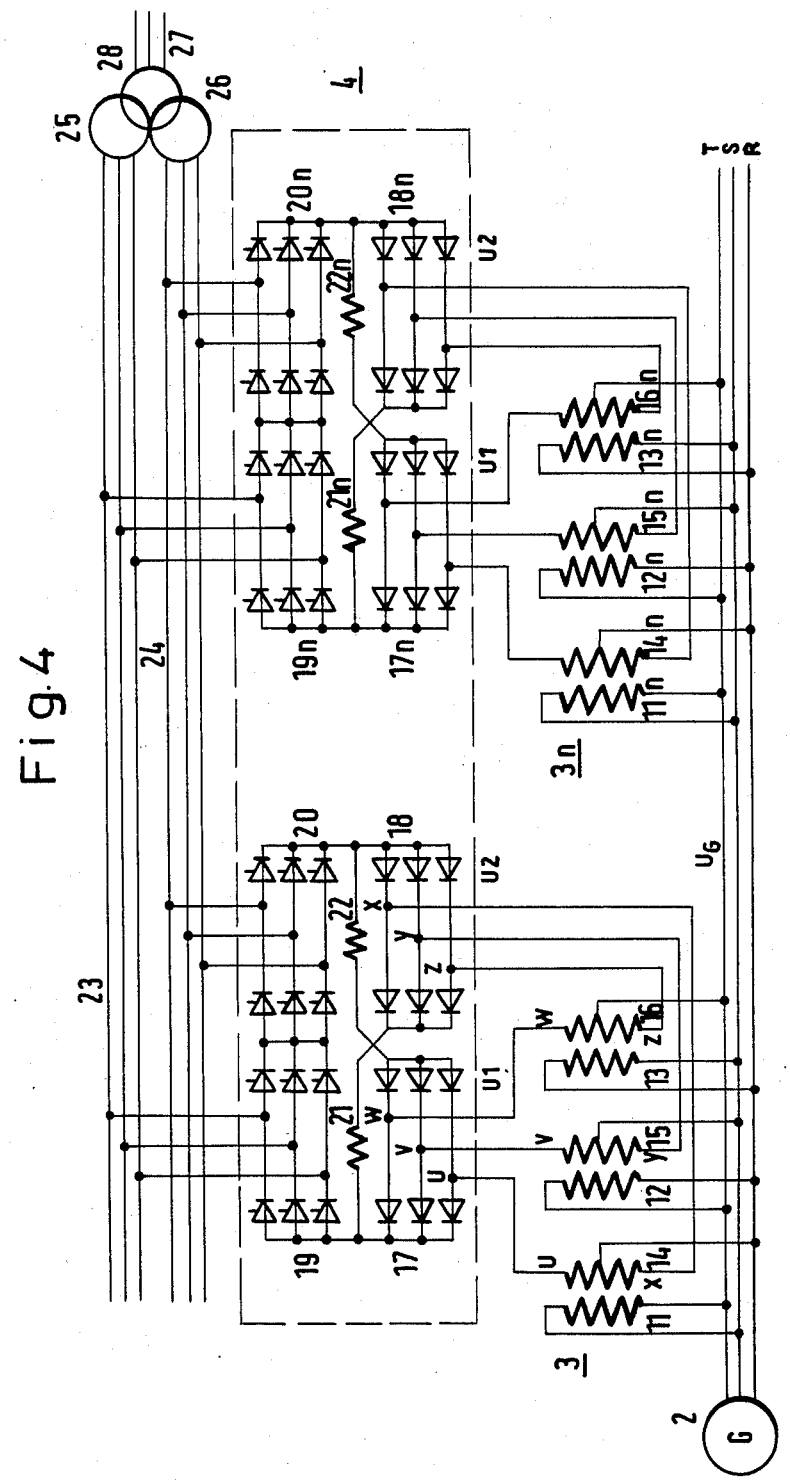
FIG. 4 is a 12-pulse schematic and block diagram with several parallel, electrically separated d-c circuits.

FIG. 4 shows a 12-pulse block diagram with several parallel, electrically separate d-c circuits as an example of this. The terminals R, S and T of the three-phase generator 2 are connected to the primary windings 11, 12, 13 ... 11n, 12n, 13n (n=integral or whole number) of n shifting transformers 3 ... 3n, in the manner described under FIG. 2. The terminals U, V, W of the secondary windings 14, 15, 16 ... 14n, 15n, 16n assigned to the first voltage system with the voltage $U_1$ are connected to rectifier bridges 17 ... 17n, while the terminals Z, Y, X assigned to the second voltage system with the voltage $U_2$ of the secondary windings 14, 15, 16 ... 14n, 15n, 16n are connected to rectifier bridges 18 ... 18n. In each case, two rectifier bridges 17, 18 ... 17n, 18n are connected in parallel in order to feed a d-c circuit, and in each case they are connected to two inverter bridges 19, 20 ... 19n, 20n. The first poles of the d-c circuits are directly connected to the plus poles of the rectifier bridges 17 ... 17n, and the plus poles of the rectifier bridges 18, 18n are connected through chokes 21 ... 21n. The second poles of the d-c circuits are directly connected to the minus poles of the rectifier bridges 18 ... 18n, and the minus poles of the rectifier bridges 17 ... 17n are connected through chokes 22 ... 22n.

Two series-connected three-phase bridges 19, 20 ... 19n ... 20n controlled as inverters are connected to each of the n electrically separated d-c circuits obtained in this manner. On the output side, the three-phase bridges 19 ... 19n are connected to a first threephase bus 23 and the three-phase bridges 20 ... 20n are connected to a second three-phase bus 24. The three-phase buses 23 and 24 are respectively connected to first and second primary windings 25 and 26 of a three-winding three-phase transformer 27 (corresponding to the network transformer 7 according to FIG. 1). Feeding into the three-phase line (corresponding to the line 8 of FIG. 1) is accomplished through a secondary winding 28 of the transformer 27.

By using several electrically separate d-c circuits each having its own current regulator, accurate subdivision of the current under all operating conditions and independently of the mechanical construction is achieved. Each d-c circuit is equipped with control and protection devices of their own, so that a high degree of reliability and redundancy is obtained.

Since a separate shifting transformer is assigned to each d-c circuit, each converter is therefore given a certain share of its own in the commutation reactance. This considerably facilitates an independent firing of the converters which is difficult to accomplish if the commutation reactance is exclusively common.

The rectifier bridges 17 ... 17n, 18 ... 18n can be equipped as desired with thyristors or with diodes. In the latter case, the control is only accomplished by the generator and the inverter bridges 19 ... 19n, 20 ... 20n, while in the former case, the thyristors of the d-c bridges can also fulfill certain control functions. The advantages of a thyristor rectifier are very fast generator current control as well as effective protection by current limitation through current interruption within a period and through rapid reclosing. Furthermore, one generator switch and one d-c circuit breaker can be dispensed with. The advantages of a diode rectifier are the reduced costs of the valves or rectifiers, the lower losses and the elimination of the valve or rectifier control circuits. If the rectifier bridges 17 ... 17n, 18 ... 18n are equipped with diodes, a d-c circuit breaker or a generator switch is necessary for switching off fault currents.

If the d-c bridges are equipped with thyristors, any fault current on the line (such as a short circuit current) can be kept away from the generator 2. The current rise in this case is limited by the chokes 21 ... 21n, 22 ... 22n of the intermediate d-c link. The fault current can be kept in the noncritical range of the generator, in conjunction with the current regulation of the rectifier.

If an internal fault occurs in the converter, such as a flashover through a converter valve or rectifier, a rectifier bridge equipped with a thyristors acts like a circuit breaker switching within a period and reduces the number of torque shocks to 1. In a diode-equipped rectifier bridge, the generator switch must go into action in the case of such a fault, assisted by the fast-acting de-energizing of the generator.

The foregoing is a description corresponding in substance to German Application No. P 33 42 210.9, filed Nov. 23, 1983, the International priority of which is being claimed for the instant application, and which is hereby made part of this application. Any material discrepancies between the foregoing specification and the aforementioned corresponding German application are to be resolved in favor of the latter.

I claim:

1. High voltage d-c transmission power station, comprising at least one three-phase generator producing a generator voltage, at least one shifting generator transformer having primary windings and having secondary windings with center taps and external terminals, said center taps being connected to said generator for receiving said generator voltage, said external terminals providing voltages in two three-phase voltage systems phase-shifted through 30° relative to each other, and at least one 12-pulse high voltage d-c short coupler having converters connected to said external terminals for receiving said voltages of said two three-phase voltage systems.

2. High voltage d-c transmission power station according to claim 1, wherein said converter of said short coupler include two rectifier bridges connected in parallel on the d-c side by chokes.

3. High voltage d-c transmission power station according to claim 2, wherein said at least one shifting transformer is in the form of a multiplicity of shifting transformers, and said short coupler is formed of a multiplicity of parallel, electrically separate d-c circuits each being fed by a respective one of said shifting transformers.

4. High voltage d-c transmission power station according to claim 1, wherein said converters of said short coupler include rectifier bridges having diodes and a generator switch for protecting said generator.

5. High voltage d-c transmission power station according to claim 1, wherein said converters of said short coupler include rectifier bridges having thyristors.

* * * * *